UNITED STATES PATENT OFFICE.

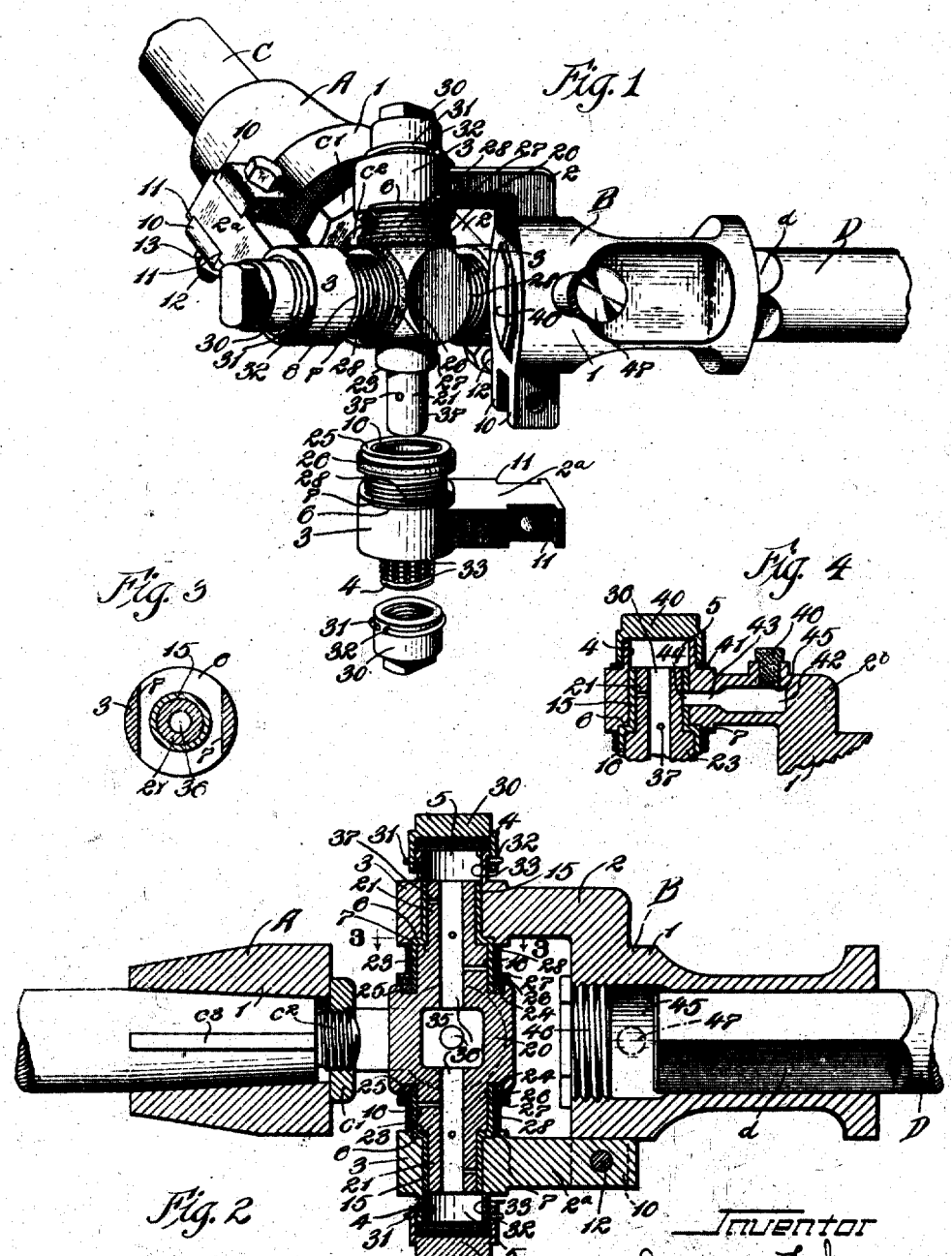

ISADOR LEHMAN, OF CLEVELAND, OHIO; HERMAN STERN AND HARRY J. SCHLOSSER, EXECUTORS OF SAID ISADOR LEHMAN, DECEASED, ASSIGNORS TO ARNOLD L. STEINFELD AND EDWIN STEINFELD, BOTH OF NEW YORK, N. Y.

UNIVERSAL JOINT.

1,247,291.      Specification of Letters Patent.      Patented Nov. 20, 1917.

Application filed February 28, 1916. Serial No. 80,792.

*To all whom it may concern:*

Be it known that I, ISADOR LEHMAN, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to improvements in universal joints, and it has for one of its objects to provide a novel construction whereby a lubricant may be contained within the joint and thoroughly distributed to the operating parts thereof, the construction including effective yet simple dust excluding means whereby the working parts are protected against dirt or grit, without the use of a casing which, as is well known, has its disadvantages and undesirable features.

A further object of the invention is to provide a joint comprising, generally, a cross shaped element, the branches whereof constitute trunnions, and a pair of forks having apertures in their branches for the reception of the trunnions, one of the branches of one or both forks being separably connected to the body portion of the fork, so that such branch may be conveniently removed and the elements of the joint disconnected.

My improved construction further provides a convenient means of introducing a lubricant into the joint.

Another object comprehended by my invention is the incorporation of a grease well or chamber in the hub or body portion of the joint element which has sliding connection with one of the shaft sections, whereby such connection will be constantly and thoroughly lubricated.

Further objects of my invention will become apparent as this description proceeds, and any and all of the objects are attained in the construction illustrated in the accompanying drawing, and while I will proceed to describe the construction in detail, I wish to be understood as not limiting myself to the structural details thereof further than is required by the terms of the annexed claims and is rendered necessary by the state of the prior art.

In the drawing Figure 1 is a perspective view of the joint with the separable branch of one of the forks removed from the body portion thereof, and the cap of such branch removed; Fig. 2 is a central section through the joint longitudinally of the shaft sections which it connects; Fig. 3 is a section on the line 3—3 of Fig. 2; and Fig. 4 represents a modified form of cap and branch for the forks.

Describing the invention by the use of reference characters, A denotes, generally, one of the forks, and B the other, the former having rigid connection with a shaft member C, the tapered end whereof is secured within the correspondingly shaped bore of the fork A by the nut $c'$ that is threaded onto the extension $c^2$ of the shaft, a key $c^3$ serving to lock the shaft and fork against relative angular movement, and the fork B having sliding connection with the squared end $d$ of the shaft section D. In all respects other than their mode of connection and association with their respective shaft sections, the forks A and B are identical, and each comprises a head or body portion 1 from one end of which projects laterally and then beyond said end a branch 2 that terminates in a cylindrical boss 3 having an outward externally threaded extension 4 through which and the boss 3 there extends a bore 5, the inner face of the boss being incut transversely to form a recess 6, having parallel side walls 7, as clearly illustrated in Fig. 3. The opposite branch of each fork is identical to that just described except as regards its connection with the body portion or hub of the fork. The branch now under consideration, and designated $2^a$, is separably connected to the hub or body portion of the fork in the following manner: The hub is provided with a pair of ears 10 that are spaced apart and between which the shank of the branch $2^a$ is adapted to be received, the branch having abutments 11 that engage each with an edge of one of said ears, whereby the branch is held firmly against any but a movement radially of the hub or body portion, the shank and ears having alining apertures for the reception of a bolt 12, which extends through said apertures and has a nut 13 applied to its threaded end. Thus, the shank is held between the ears 10 against the aforesaid radial movement.

A bushing 15 is preferably press fitted within the bore of each boss 3 and extends into such bore to substantially the plane of the outer end of said boss. An enlargement 16 is formed on the bushing adjacent the inner end of the boss and is of a shape to fit the recess 6 of such boss, the straight sides of the enlargement 16 engaging the sides 7 of the recess, thereby positively locking the bushing against turning within the bore.

The power transmitting element 20 of the joint is cross shaped, and each of its branches constitutes a trunnion 21 that projects into the bore of one of the bushings 15, the inner portion of each trunnion—or the portion occupying the zone between the boss 3 and the body portion of the element 20—and likewise the corresponding portion of the bore of the bushing 15, are enlarged to form coöperating shoulders between the bushing and trunnion, at 23. It will be observed that an annular groove 24 is formed within the face of the body portion of the power transmitting element (to which body portion the numeral 20 is applied), and that such groove is occupied by a ring 25 that is pressed upon or otherwise secured to the inner end of the bushing, and that the outer surface of such ring is flush with the adjacent surface of the body portion 20. Prior to applying the ring 25 to the bushing, a washer 26 of packing material, such as felt, and a metal washer 27, which backs up the washer 26, together with a compression spring 28, are slipped over the end of the bushing, and said spring is confined between the metal washer and the opposed face of the enlargement 16 of the bushing. Of course where the sides of the enlargement 16 are sliced off to fit the side walls of the recess 6, the spring bears directly upon the face of the boss. The spring 28 serves to press the washer 26 firmly against the flush surfaces of the ring 25 and the body portion 20, and effectually seal the only crevice through which dust could enter to the working surfaces of the joint, or through which lubricant could be expelled.

Caps 30 are threaded upon the extensions 4 of the bosses 3, and constitute oil or grease cups. In Figs. 1 and 2, the cap 30 is shown as substantially surrounded by a spring ring 31, one end of which is turned radially inward through an aperture 32 in the side of the cap, where it may coöperate with longitudinal notches 33, that are formed in the threaded surface of the extension 4, to lock the cap against unscrewing.

The body portion 20 of the power transmitting element has a cavity 35 from which a bore 36 extends through each of the trunnions 21, and each trunnion has a plurality of ports 37 which communicatively connect their outer working surfaces with their bores. A lubricant, such as suitable and reasonably heavy grease, may be introduced into the bores and cavity 35 of the element 20 through the bores 5 of the bosses 3, by the removal of the caps 30 therefrom. With the cavity and bores of the element 20, and the bores of the bosses 3 filled with grease, and the caps 30 also filled with such lubricant, said caps may be replaced and threaded inward upon the extensions 4 until the ends of their spring rings 31 coöperate with the notches 33 in the extensions 4 to hold them against accidental withdrawal. Now as the grease is consumed, the grease within the caps 30 may be forced into the bores and cavity of the element 20, by turning up the caps, the caps thus acting as ordinary grease cups.

When a comparatively thin or freely flowing lubricating oil is used, I prefer to employ caps 40 for closing the extensions 4 of the branches of the forks. These caps, one of which is shown in Fig. 4, need not be provided with the spring rings 31, as they are intended to be screwed firmly against the washers 41 of packing material (such as cork), the binding or wedging thus created between the threads and the resilient washers being sufficient to lock the caps against unscrewing. This arrangement permits an oil of the above nature to be advantageously employed, as the same is effectually held within the joint, and is thoroughly distributed throughout the same because of the thorough communication between all of the parts of the joint and the fact that the joint rotates continually while in operation.

The branch shown in Fig. 4, and designated 2ᵇ, is made hollow, as by coring the same when cast, to provide a lubricant chamber 42 that communicates, through alining ports 43 and 44 in the arm and bushing 15, respectively, with the working surface of the trunnion 21. Lubricant may be introduced into the chamber 42 through an opening 45, that is preferably threaded for the reception of a plug 46, of any approved form, an ordinary cork being preferable as it can readily be screwed into the threads of the opening, and, when saturated with the lubricant, will expand or swell enough to firmly hold it against accidental displacement.

The inner end of the squared socket of the hub or body portion 1 of the fork B, opens into a lubricant well or chamber 45, the chamber herein shown constituting a recess in the inner end of the hub that is closed by a threaded plug 46, although it will be understood that any approved construction may be substituted for this, whereby the desired end is attained. The shank of a grease cup 47 is threaded through one of the walls of the well or chamber, and by means of such cup, grease may be introduced into the well as required, and the working of the end of the shaft section D within the socket of the fork will cause such lubricant to be forced between the coöperating faces and walls of the shaft and fork.

Having thus described my invention, what I claim is:—

1. A universal joint comprising a cross shaped element the branches whereof constitute trunnions, and a pair of forks having apertures in their branches for the reception of said trunnions, the body portion of one fork having a pair of ears between which the shank of one of its branches is received, said branch having abutments that engage each an edge of one of said ears, and means for securing the shank between said ears.

2. A universal joint comprising a power transmitting element having trunnions, a pair of forks having apertures in their branches for the reception of said trunnions, each branch having a hollow threaded extension which communicates with its aperture and having a series of recesses, a cap for application to such extension, and means carried by the cap and coöperating with the recesses in the extension for holding the cap against turning with respect thereto.

3. A universal joint comprising a power transmitting element having trunnions, a pair of forks having bores in their branches for the reception of the end portions of said trunnions, a tubular member surrounding the remaining portion of each trunnion and projecting inward from the inner face of the adjacent branch to the opposed surface of the aforesaid element, a washer of packing material surrounding said member, and means interposed between said washer and the aforesaid branch for pressing said washer against the power transmitting element.

4. A universal joint comprising a power transmitting element having trunnions, a pair of forks having apertures, a bushing within each aperture for the reception of one of said trunnions, said bushing extending inward from the branch to the body portion of the power transmitting element, a washer of packing material surrounding said bushing, and a spring for pressing said washer against the aforesaid body portion.

5. A universal joint comprising a power transmitting element having tubular trunnions, a pair of forks having apertures in their branches, a bushing within each aperture and extending inward from the branch in proximity to the body portion of the aforesaid element, means for delivering a lubricant to the bores of the trunnions, a washer of packing material surrounding the bushing adjacent the aforesaid body portion, and a spring interposed between such washer and the branch for pressing said washer against the body portion.

6. A universal joint comprising a cross shaped element the branches whereof constitute trunnions, each trunnion having inner and outer portions of greater and lesser diameter respectively, a pair of forks having apertures in their branches, bushings within said apertures for the reception of the trunnions and having bores which correspond in shape to said trunnions, the body portion of the power transmitting element having an annular groove which surrounds its trunnion and into which the inner end of the bushing extends, a ring within said groove and secured to the bushing, the outer surface of the ring being substantially flush with the surface of the aforesaid body portion, a washer of compressible material surrounding the bushing and bearing upon the surfaces of the aforesaid ring and body portions, a metallic washer bearing upon the former washer, and a compression spring interposed between the metal washer and the aforesaid branch.

7. A universal joint comprising a cross shaped element the branches whereof constitute trunnions, a pair of forks having apertures in their branches, bushings within said apertures for the reception of the trunnions, the body portion of the power transmitting element having an annular groove which surrounds its trunnion and into which the inner end of the bushing extends, a ring within said groove and secured to the bushing, the outer surface of the ring being substantially flush with the surface of the aforesaid body portion, a closure surrounding the bushing, and means for pressing the closure against the surface of the aforesaid ring and body portions.

8. A universal joint comprising a power transmitting element having trunnions, a forked member having a bore in each of its branches for the reception of the end portion of one of said trunnions, said branches being separable whereby they may be removed from the trunnions, a tubular member surrounding the remaining portion of each trunnion and projecting inward from the inner face of the branch to the opposed surface of the element, the inner end of said tubular member having an abutment portion and the element having a recess for the reception of the abutment, a washer of packing material surrounding the tubular member, and a spring interposed between said washer and the branch for pressing the washer against the power transmitting element, the aforesaid abutment serving to prevent the displacement of the washer when the branch is removed from the trunnion.

In testimony whereof, I hereunto affix my signature.

ISADOR LEHMAN.